(12) United States Patent
Asenkerschbaumer et al.

(10) Patent No.: US 12,139,095 B2
(45) Date of Patent: Nov. 12, 2024

(54) GAS GENERATOR

(71) Applicant: ZF Airbag Germany GmbH, Aschau a. Inn (DE)

(72) Inventors: Dominik Asenkerschbaumer, Neuötting (DE); Rolf Ruckdeschel, Heldenstein (DE); Bernd Weber, Erharting (DE); Detlef Last, Mühldorf (DE)

(73) Assignee: ZF AIRBAG GERMANY GMBH, Ascau a. Inn (DE)

( * ) Notice: Subject to any disclaimer, the term of this patent is extended or adjusted under 35 U.S.C. 154(b) by 25 days.

(21) Appl. No.: 17/784,176

(22) PCT Filed: Oct. 8, 2020

(86) PCT No.: PCT/EP2020/078206
§ 371 (c)(1),
(2) Date: Jun. 10, 2022

(87) PCT Pub. No.: WO2021/115662
PCT Pub. Date: Jun. 17, 2021

(65) Prior Publication Data
US 2023/0022931 A1    Jan. 26, 2023

(30) Foreign Application Priority Data
Dec. 13, 2019 (DE) .................... 102019134263.5

(51) Int. Cl.
*B60R 21/272* (2006.01)
*B60R 21/264* (2006.01)
*F42B 3/04* (2006.01)

(52) U.S. Cl.
CPC ........ *B60R 21/272* (2013.01); *B60R 21/2644* (2013.01); *F42B 3/04* (2013.01)

(58) Field of Classification Search
CPC ...... F42B 3/04; B60R 21/2644; B60R 21/272
(Continued)

(56) References Cited

U.S. PATENT DOCUMENTS 3,904,221 A * 9/1975 Shiki .................... F42B 3/04
280/736
7,188,567 B1  3/2007 Italiane et al.
(Continued)

FOREIGN PATENT DOCUMENTS

DE     4338536 A1   5/1995
DE    29818957 U1   2/1999
(Continued)

OTHER PUBLICATIONS

Author Unknown, BASF Basotect G+ Foam Material Property Data, Date Unknown, Internet Publication @ MatWeb.com, found here: https://www.matweb.com/search/datasheet.aspx?MatGUID=fb0a8978fe6a40368ff16948ed4d420b. (Year: 2023).*
(Continued)

*Primary Examiner* — Bret Hayes
(74) *Attorney, Agent, or Firm* — Kristin L. Murphy

(57) ABSTRACT

A gas generator for a safety device in a vehicle includes a housing and a combustion chamber located inside the housing. A pyrotechnic propellant and at least one filling body are accommodated in the combustion chamber. The filling body is made of a melamine resin foam.

17 Claims, 1 Drawing Sheet

(58) Field of Classification Search
USPC ......................................................... 102/530
See application file for complete search history.

(56) References Cited

U.S. PATENT DOCUMENTS

2008/0067001 A1* 3/2008 Sviridenko ......... B60R 13/0838
181/286
2011/0241324 A1* 10/2011 Nakayasu ........... B60R 21/2644
280/736

FOREIGN PATENT DOCUMENTS

| | | |
|---|---|---|
| DE | 202006004008 U1 | 7/2006 |
| DE | 112018001843 T5 | 12/2019 |
| EP | 0653336 A1 | 5/1995 |
| JP | 2018187985 A | 11/2018 |

OTHER PUBLICATIONS

International Search Report and Written Opinion for PCT/EP2020/078206 mailed Nov. 13, 2020 (10 pages; with English translation).

* cited by examiner

GAS GENERATOR

CROSS-REFERENCE TO RELATED APPLICATIONS

This application is a national stage of International Application No. PCT/EP2020/078206, filed Oct. 8, 2020, the disclosure of which is incorporated herein by reference in its entirety, and which claimed priority to German Patent Application No. 102019134263.5, filed Dec. 13, 2019, the disclosure of which is incorporated herein by reference in its entirety.

TECHNICAL FIELD

The disclosure relates to a gas generator for a safety device in a vehicle.

BACKGROUND

Gas generators provide, for example, gas for filling an airbag or for driving a belt tensioner. For this purpose, the gas generator contains, in a combustion chamber, a gas-generating pyrotechnic propellant which can be activated as needed and disintegrates very rapidly forming gaseous products.

The pyrotechnic propellants are balanced mixtures of organic or inorganic fuels and oxidants usually containing nitrogen and carbon. A suitable shape, such as pellets, extrudates and granules of diverse geometry, can be imparted to the propellants for controlling the burning characteristic.

Movements of the propellant inside the combustion chamber which are caused by vibrations, for example, can cause a rattling noise. To prevent undesired movements of the propellant inside the combustion chamber, filling bodies are inserted in the combustion chamber for fixing the propellant.

Elastic wire or sheet metal bodies, silicone bodies or silicone foam have been used as filling bodies.

Wire or sheet metal bodies have a high weight and a low long-term elasticity, however. In addition, they can have a negative impact on an output of the gas generator, as they can at least partially absorb heat generated during reaction of the pyrotechnic propellant and, thus, cool the gas. Moreover, those components can dissipate the absorbed heat to further components, thereby allowing undesired over-ignition to further combustion chamber to occur in multi-stage gas generators, for example.

Molded silicone bodies are comparatively expensive and have only small volume compensating capacity. Silicone foams compensate more volume, but can have a poor stability during combustion. In addition, detrimental gases, burnable gases and/or particulates may form by the disintegration of the silicone.

SUMMARY

What is needed a low-cost gas generator which is suited for use in safety devices and by which the drawbacks of prior art can be overcome.

According to the disclosure, a gas generator for a safety device in a vehicle is disclosed. The gas generator comprises a housing and a combustion chamber located inside the housing, with a pyrotechnic propellant and at least one filling body being accommodated in the combustion chamber and the filling body being formed of a melamine resin foam.

The at least one filling body of melamine resin foam provides high volume compensating capacity, is long-term stable and is available at low cost.

Melamine resins are synthetic resins based on melamine and formaldehyde and can form a branched network by poly-condensation. Also, melamine-phenol-formaldehyde resins and/or melamine-urea-formaldehyde resins can be used as melamine resin.

In one exemplary arrangement, the filling bodies of melamine resin foam disintegrate in an output-neutral manner. In this case, it is understood by the term "output-neutral" that the disintegration of the filling body consumes about as much energy as the reaction of the melamine resin foam to gaseous reaction products supplies, in particular by the reaction of the carbon present in the melamine resin foam to $CO_2$.

Melamine resin foams disintegrate merely into $N_2$ and $CO_2$. Accordingly, no detrimental gases are formed during disintegration of the at least one filling body of melamine resin foam. Moreover, additional gas that contributes to the further increase in pressure and to gas yield of the gas generator is generated by the disintegration of the melamine resin foam.

Melamine resin foam further has a low thermal conductivity. Thus, the disintegration of the melamine resin foam does not negatively affect the gas generator output, and component parts of the gas generator disposed in the vicinity of the at least one filling body are prevented from being heated inadvertently.

The at least one filling body is in contact with the pyrotechnic propellant so that the selection of the melamine resin foam can depend especially on the compatibility with the selected propellant.

The pyrotechnic propellant may contain a fuel and, optionally, an oxidant. Basically, all pyrotechnic propellants known to those skilled in the art from prior art are taken into account.

The fuel may comprise a material selected from the group consisting of boron, aluminum, silicon, magnesium, iron, titanium, tungsten, copper, carbon, zirconium, alloys of the afore-mentioned elements, nitrotriazolone, nitrocellulose, guanidine compounds, specifically guanidine nitrate, and/or combinations thereof.

The oxidant may comprise a material selected from the group consisting of potassium perchlorate, potassium nitrate, potassium chlorate, barium nitrate, strontium nitrate, sodium nitrate, sodium perchlorate, lithium nitrate, iron oxide, copper oxide, ammonium perchlorate, ammonium nitrate and/or combinations thereof.

In one exemplary arrangement, the melamine resin foam is a thermosetting polymer foam.

Melamine resins can be polymerized by a progressive poly-condensation into a branched network resulting in thermosetting polymer foams. In particular, the melamine resin foam is polymerized throughout, which is understood to be the fact that substantially all free functional groups within the polymer foam are reacted to exhaustion, in particular all free hydroxyl and amino groups. In this case, free functional groups are still present exclusively at the free chain ends of the polymer foam.

In another exemplary arrangement, the melamine resin foam is an open-cell polymer foam. The open-cell structure in this case can result in particularly good sound absorption, as sound waves are not only reflected by the surface of the at least one filling body but can also penetrate the latter. The sound energy then can be dissipated in the network of the melamine resin foam. Rattling noise in the gas generator is suppressed by the good sound absorption. Rattling noise can occur, for example, by slight vibrations of a vehicle during driving, when the gas generator is installed on or in said vehicle.

The open-cell structure moreover helps increase the flexibility in the shaping of the melamine resin foam and, resp., of the filling body made of the melamine resin foam.

In one exemplary arrangement, the filling body is elastically deformable. In this way, a good damping effect of the filling body made of the melamine resin foam is achieved, while simultaneously the long-term stability is maintained.

The at least one filling body can have a disintegration temperature of at least 200° C., and in one exemplary arrangement, of at least 240° C. In another exemplary arrangement, the at least one filling body can have a disintegration temperature of at least 300° C. In one exemplary arrangement, the at least one filling body has a maximum disintegration temperature of 400° C. At a lower disintegration temperature, inadvertent damage of the filling body over the service life of the gas generator or premature disintegration may occur, whereas a higher disintegration temperature may impede the complete combustion of the filling body in the case of release of the gas generator.

The at least one filling body may have a density ranging from 3 to 15 g/l. In one exemplary arrangement, the at least one filling body has a density ranging from 4 to 12 g/l. In yet another exemplary arrangement, the at least one filling body has a density ranging from 4 to 9.5 g/l. In this way, very low weight of the at least one filling body is obtained, resulting in a reduction of the total weight of the gas generator.

The at least one filling body may be provided in the form of a cuboid, a cylinder, a hollow cylinder, a ball, a mat, a disk and/or a perforated disk.

The shape of the at least one filling body may be adapted to correspond to the geometry of the gas generator as well as to the geometry of the pyrotechnic propellant used.

The at least one filling body may be arranged between and/or enclose the pyrotechnic propellant.

Melamine resin foams can be provided especially simply in a variety of shapes. For this purpose, usually at first blocks are manufactured from the melamine resin foam which are subsequently split into mats, for example using a knife gate. After that, any geometries can be punched out of the mats.

In one exemplary arrangement, the at least one filling body is disposed on the walls of the combustion chamber so that the pyrotechnic propellant is prevented from abutting against the walls of the combustion chamber.

In one exemplary arrangement, the gas generator has plural combustion chambers in each of which a pyrotechnic propellant and at least one filling body is accommodated. Due to the low thermal conductivity of the filling bodies, the combustion chambers can be thermally uncoupled from each other. In this way, the heat developing in a first combustion chamber when the propellant is ignited is prevented from being guided inadvertently via the filling body to another combustion chamber and from causing ignition of the propellant there in the further combustion chamber. Hence, control of the behavior of the gas generator in the event of release can be further increased.

Apart from the at least one filling body made of melamine resin foam, in one exemplary arrangement, the gas generator includes no further volume compensation arrangement, i.e., there is provided exclusively the melamine resin foam as filling body. Correspondingly, no volume compensation arrangement of wire, sheet metal, silicone elastomer and/or silicone foam is provided in this exemplary arrangement.

The gas generator may also be part of a module which additionally comprises an inflatable airbag and a mounting arrangement for arranging the module in a vehicle.

Also, the gas generator according to the disclosure can be part of a vehicle safety system, for example for the protection of a person such as an occupant of the vehicle and/or a pedestrian, comprising an airbag inflatable by the gas generator. In one exemplary arrangement, the gas generator may be part of a module, and an electronic control unit by which the gas generator according to the disclosure can be activated, if a situation of release is given.

BRIEF DESCRIPTION OF DRAWINGS

Further characteristics and advantages of the disclosure will result from the following description of exemplary arrangements, which are not intended to be understood in a limiting sense, and from the drawings, wherein.

DETAILED DESCRIPTION

Figure 1:
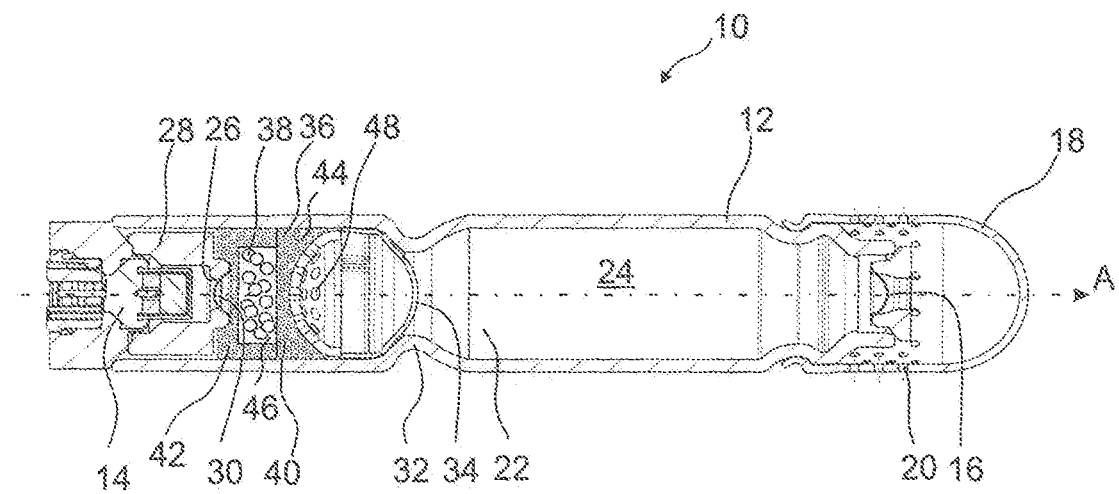
FIG. 1 shows a gas generator according to an exemplary arrangement of the disclosure.

FIG. 1 shows a gas generator 10 according to the disclosure. The gas generator 10 has an elongate cylindrical housing 12 at a first axial end of which an igniter 14 is provided and at a second axial end of which the housing 12 is sealed by a membrane 16 against the environment of the gas generator 10.

A diffusor 18 provided with discharge openings 20 is connected to the housing 12 in an axial direction and guides gas discharging from the diffusor 18 to a safety device to be activated (not shown).

The housing 12 encompasses a pressure chamber 22 that is connected to the igniter 14 in the axial direction A. The pressure chamber 22 is filled with a compressed gas 24.

The compressed gas 24 comprises at least one inert gas such as argon, helium and/or nitrogen or any other suitable gas mixture, and moreover may contain a gaseous oxidant. In one exemplary arrangement, the gaseous oxidant includes for a major part, i.e., for more than 50 mol-%, of oxygen.

The igniter 14 is separated from the pressure chamber 22 in a pressure-tight and gas-tight manner. For this purpose, an opening 26 in an igniter housing 28 in which the igniter 14 is accommodated is sealed toward the pressure chamber 22 by an igniter membrane 30.

The housing 12 forms the outer housing of the gas generator 10 and is provided with a peripheral annular groove 32 on which a burst member 34 is retained.

The burst member 34 divides the pressure chamber 22 forming a combustion chamber 36 adjacent to the igniter 14 in the axial direction A.

In the combustion chamber 36, a pyrotechnic propellant 38 as well as a filling body 40 are disposed.

In the shown exemplary arrangement, the pyrotechnic propellant 38 is present in the form of pellets being enclosed by the filling body 40 inside the combustion chamber 36.

The pyrotechnic propellant 38 comprises a guanidine compound, specifically guanidine nitrate, as fuel.

The filling body 40 in the illustrated exemplary arrangement is composed of a first filling body part 42 and a second filling body part 44.

The first filling body part 42 is shaped so that a cavity 46 is formed in which the pyrotechnic propellant 38 is accommodated. In one exemplary arrangement, the first filling body part 42 is in the form of a hollow cylinder open to one side the free end of which is closed by the second filling body part 44.

In one exemplary arrangement, the filling body 40 configured as a hollow cylinder can abut positively or non-positively on the housing 12 or can extend to the annular groove 32 and, thus, be fixed in the pressure chamber 22.

The filling body 40 is made of a thermosetting melamine resin foam. The melamine resin foam further has an open-cell structure and is elastically deformable.

The filling body 40 has a disintegration temperature of at least 200° C. In one exemplary arrangement, the disintegration temperature is at least 240° C. In yet a further exemplary arrangement, the disintegration temperature is of at least 300° C. In a further exemplary arrangement, a maximum disintegration temperature is 400° C.

Moreover, in one exemplary arrangement, the filling body 40 has a density ranging from 3 to 15 g/l. In a further exemplary arrangement, the density of the filling body 40 is from 4 to 12 g/l. In yet a further exemplary arrangement, the density of the filling body 40 is from 4 to 9.5 g/l.

Basically, the first filling body part 42 and the second filling body part 44 can also differ in their composition and their properties, for example they can have different disintegration temperatures and/or densities. In this way, the behavior of the gas generator 10 can be further tailored in the event of release.

In addition, a screen 48 disposed in the combustion chamber 36 opposite to the igniter 14 is provided in front of the burst member 34.

Such a gas generator may be designed particularly to the effect that a shockwave which quickly and safely opens the membrane 16 is triggered by the destruction of the burst member 34.

As an alternative to the exemplary arrangement illustrated in FIG. 1, the burst member 34 may also be dispensed with. The combustion chamber 36 and the pressure chamber 22 then are separated from each other only by the screen 48 which may be fixed to the peripheral annular groove 32. Moreover, the screen 48 helps produce a pressure compensation so that the pyrotechnic propellant 38 and the filling body 40 can be in direct contact with the pressure gas 24 and the oxidant optionally contained in the latter.

The gas generator shown and described here which includes the pressure gas 24 may also be referred to as hybrid gas generator, and possibly also as a cold gas generator, as it includes a portion of stored compressed gas. However, the disclosure is not limited thereto, which means that also so-called "pure" pyrotechnic gas generators which are free from a portion of stored compressed gas are comprised by the disclosure as well. In other words, the presence of a pre-stored compressed gas inside the gas generator is not necessary or decisive for the disclosure.

When the gas generator 10 is activated, the igniter 14 receives an electric signal on a known path to ignite the former. The related sudden rise in pressure inside the igniter 14 initially destroys the igniter membrane 30. At the same time or immediately afterwards, the filling body 40 and the pyrotechnic propellant 38 in the combustion chamber 36 are heated by the hot gases and/or particles released by the igniter 14 so that a reaction of the pyrotechnic propellant 38 starts.

The heat developing during the reaction of the pyrotechnic propellant 38 also helps disintegrate the filling body 40, with the filling body 40 disintegrating in an output-neutral manner and merely $N_2$ and $CO_2$ forming as reaction products of the filling body 40.

The development of heat occurring during said reaction further heats the compressed gas 24 so that excess pressure is formed. By said excess pressure at first the burst member 34 is destroyed and after that the membrane 16 is suddenly opened. The heated compressed gas 24 then can flow out of the pressure chamber 22 via the diffusor 18 and the discharge openings 20 into the environment and can actuate the safety device.

The destruction of the burst member 34 can further trigger a shockwave which propagates through the pressure chamber 22 and very quickly opens the membrane 16.

The shockwave can also start already from the igniter membrane 30 or else from the igniter 14 itself. The filling body 40 then can be used to intensify and/or control the shockwave.

As mentioned already in the foregoing, the gas generator 10 shown in FIG. 1 is a hybrid gas generator. Basically, the gas generator according to the disclosure may be any type of gas generator in which a filling body is used, such as a pyrotechnic gas generator.

Figure 2:
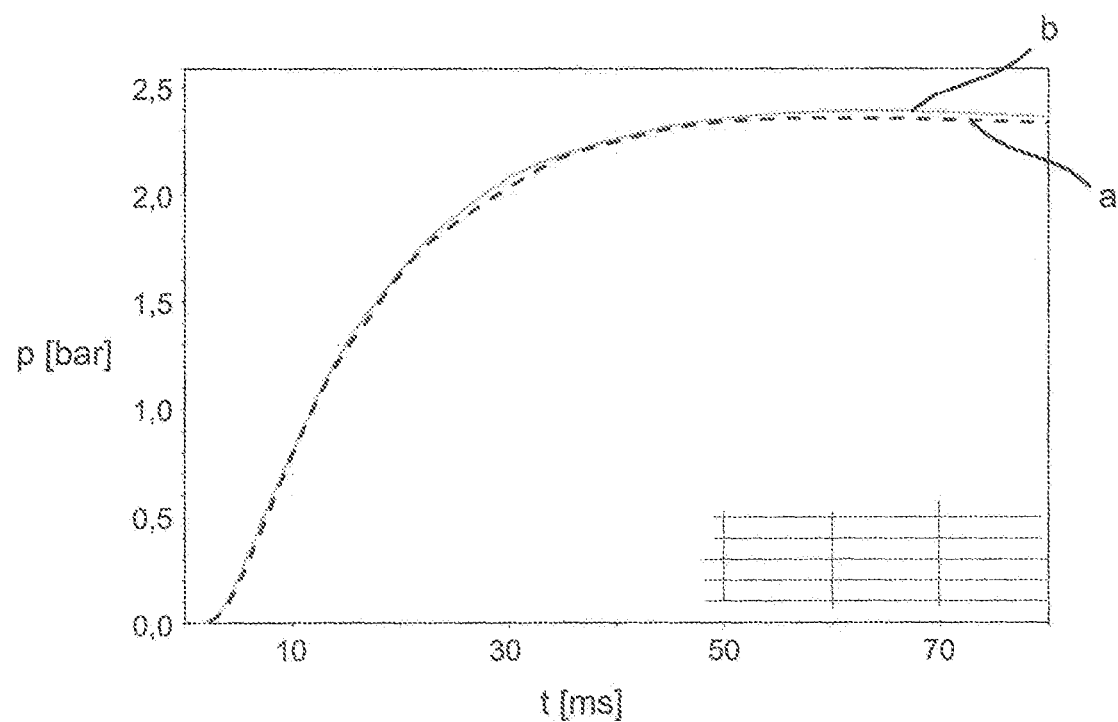
FIG. 2 shows a comparison of can pressure curves between a reference gas generator and a gas generator according to the disclosure.

FIG. 2 illustrates pressure-to-time curves of a so-called "can test". In the can test, a standard gas generator is charged with a pyrotechnic propellant and is activated in a closed test can having a defined volume (60 liters). During combustion, the pressure inside the can is measured and, in this way, a pressure-to-time curve is obtained (in FIG. 2 pressure p in bars and time t in milliseconds).

The pressure-to-time curve can be used for ballistic characterization of the respective pyrotechnic propellant and for assessing the behavior of the further constituents in the standard gas generator.

The dashed line a shown in FIG. 2 indicates the pressure-to-time curve for a reference gas generator that makes use, as volume compensation arrangement, of a component of knitted metal as it is known from prior art.

The solid line b indicates the pressure-to-time curve for a gas generator according to the disclosure that makes use, as volume compensation arrangement, of a filling body made of melamine resin foam.

In both can tests otherwise like components, like charges and like propellant compositions were used. Correspondingly, the relative variations between the tests can be attributed to the different volume compensation arrangement.

As is evident from FIG. 2, the curve progression of the gas generator according to the disclosure substantially corresponds to that of the reference gas generator. Accordingly, filling bodies made of melamine resin foam are suited as replacement for known volume compensation arrangements but additionally offer the afore-described advantages.

When using the filling body made of melamine resin foam, moreover somewhat quicker pressure buildup and higher final pressure are achieved, as is illustrated by the pressure-to-time curves specifically around a time t of 30 ms and at the end of the can test in the achieved final pressure.

The differences in the achievable pressure have to be attributed to the additional gases released by the disintegration of the melamine resin foam and to the detrimental cooling effect of the knitted metal in the reference gas generator.

The invention claimed is:
1. A gas generator for a safety device in a vehicle, comprising a housing and a combustion chamber located inside the housing, wherein a pyrotechnic propellant and at least one filling body that comprises at least one filling body part accommodated in the combustion chamber, and wherein the filling body is made of a melamine resin foam.

2. The gas generator according to claim 1, wherein the melamine resin foam is a thermosetting polymer foam.

3. The gas generator according to claim 2, wherein the melamine resin foam is an open-cell polymer foam.

4. The gas generator according to claim 1, wherein the melamine resin foam is an open-cell polymer foam.

5. The gas generator according to claim 4, wherein the at least one filling body is elastically deformable.

6. The gas generator according to claim 5, wherein the gas generator-includes plural combustion chambers in each of which a pyrotechnic propellant and at least one filling body is accommodated.

7. The gas generator according to claim 1, wherein the at least one filling body is elastically deformable.

8. The gas generator according to claim 1, wherein the at least one filling body has a disintegration temperature of at least 200° C.

9. The gas generator according to claim 8, wherein the at least one filling body has a maximum disintegration temperature of 400° C.

10. The gas generator according to claim 1, wherein the at least one filling body has a density ranging from 3 to 15 g/l.

11. The gas generator according to claim 1, wherein the at least one filling body part is provided in the form of a cuboid, a cylinder, a hollow cylinder, a ball, a mat, a disk or a perforated disk.

12. The gas generator according to claim 1, wherein the gas generator includes plural combustion chambers in each of which a pyrotechnic propellant and at least one filling body is accommodated.

13. The gas generator according to claim 1, wherein the gas generator includes no further volume compensation arrangement.

14. The gas generator according to claim 1, wherein the at least one filling body has a disintegration temperature of at least 240° C.

15. The gas generator according to claim 1, wherein the at least one filling body has a disintegration temperature within a range of 300° C., and 400° C.

16. The gas generator according to claim 1, wherein the at least one filling body has a density ranging from 4 to 12 g/l.

17. The gas generator according to claim 1, wherein the at least one filling body has a density ranging from 4 to 9.5 g/l.

* * * * *